United States Patent [19]

Huddle

[11] 3,856,029
[45] Dec. 24, 1974

[54] DAMPING MEANS FOR PORTABLE STRUCTURES

[75] Inventor: Carl F. Huddle, Pleasant Ridge, Mich.

[73] Assignee: Tension Structures Co., Royal Oak, Mich.

[22] Filed: July 6, 1970

[21] Appl. No.: 52,619

[52] U.S. Cl. .................................... 135/1 R, 135/4
[51] Int. Cl. .......................................... E04b 1/347
[58] Field of Search .................................. 135/1–4

[56] References Cited
UNITED STATES PATENTS
3,388,711  6/1968  Huddle .............................. 135/1 R Primary Examiner—Kenneth Downey
Attorney, Agent, or Firm—C. F. Huddle

[57] ABSTRACT

This disclosure describes and illustrates longitudinal and inverted tension cables or other type of flexible or resilient members which may be unevenly spaced and/or unevenly tensioned and secured to a flexible membrane type of architectural roof structure for the purpose of eliminating or diminishing vibrations in the roof structure.

10 Claims, 7 Drawing Figures

PATENTED DEC 24 1974 3,856,029
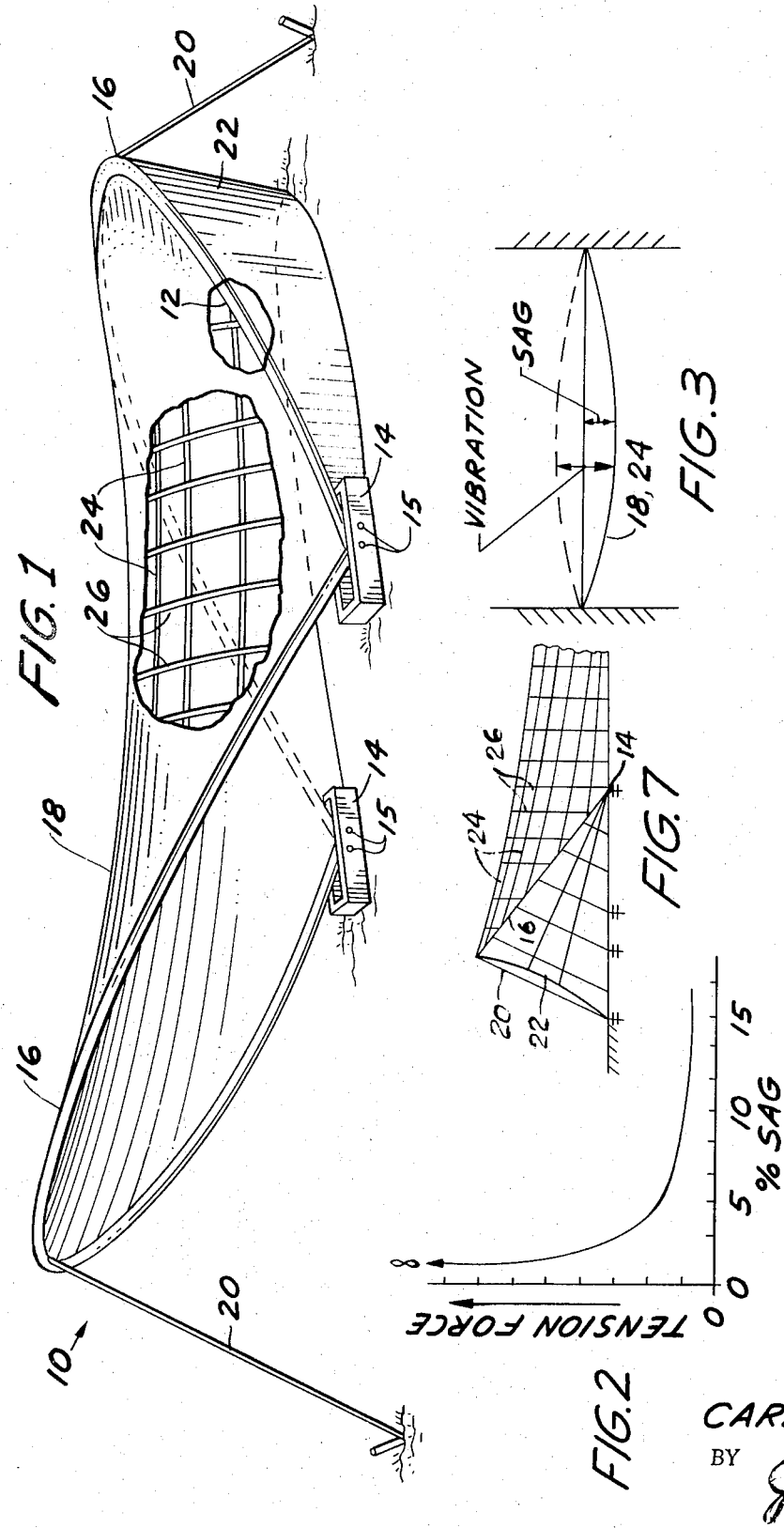
INVENTOR.
CARL F. HUDDLE
BY John P. Moran
ATTORNEY

DAMPING MEANS FOR PORTABLE STRUCTURES

SUMMARY OF INVENTION

This application is a continuation of my application Ser. no. 722946, filed Apr. 22, 1968, which, in turn, is a continuation-in-part of my application Ser. No. 654425, filed July 19, 1967, which has matured into U.S. pat. No. 3465764, dated September 9, 1969 and also of my application Ser. No. 496559, filed Oct. 15, 1965, which has matured into U.S. Pat. No. 3388711, dated June 18, 1968.

This invention relates generally to improvements in novel architectural structures of the portable soft shell type illustrated and described in the above mentioned application and patent and in U.S. Pat. No. 3,215,153 issued in the name of Carl F. Huddle on Nov. 2, 1965. More particularly, this invention relates in novel means for diminishing vibrations and/or flutter in said structures.

Since these new soft shell structures can be of very light weight construction, they are very susceptible to vibrations and flutter of the roof, end walls, and under certain conditions, vibration or shaking of the entire structure. The principal cause of such vibration is a pulsating wind force. Such flutter and vibration not only can cause damage to the structure and its contents, but could also cause the structure to fail structurally. Light weight roofing materials such as membranes of plastics, fabric, plywood, treated paper and similar materials are especially vulnerable to damage by flapping, whipping or fluttering when excited by such pulsating wind forces. These seemingly minor vibrations could constitute the beginning of a resonance of harmonic period or vibration that ultimately causes the roof system to "gallop" and/or the entire structure to shake or vibrate in increasing tempo until damage or failure occurs. While such a condition may prevail for some time before damage or failure, it certainly would not be regarded as a safe condition, especially if such a structure were occupied by a public gathering. Sudden wind squalls, thunder storms or even normal windy conditions can start such a vibratory condition. Once the structure or part of it reaches its natural frequency or even a harmonic frequency, the small pulsating wind forces serve to reinforce the natural vibratory forces, amplifying the vibratory movement and its associated forces to objectionable and/or destruction states.

One known method of eliminating or diminishing some vibrations is to add mass to the system or parts thereof, but this defeats the purpose of the low-cost, portable, semi-permanent and easily erected and disassembled structure described in the above mentioned application and patents.

Accordingly, the principal object of this invention is to provide a system of damping that can be easily applied to such light weight membrane structures that will prevent destructive vibratory action therein and make them safe for public use as well as for the shelter of property.

A further object of this invention is to provide such a system which prevents "local" flutter or whipping of light membrane material.

A more specific object of this invention is to provide such a system which comprises longitudinal support members and transverse restraining members, hereinafter called inverted members, such as cables, webbing or other flexible or resilient members, which may be unevenly spaced and/or unevenly tensioned for the purpose of eliminating or diminishing vibrations in the roof structure. The cables may vary in diameter.

Other objects and advantages of this invention will become apparent from the following detailed description, taken in conjunction with the accompanying drawings.

BRIEF DESCRIPTION OF THE DRAWING

FIG. 1 is an isometric view with parts broken away illustrating a typical architectural structure embodying the invention.

FIG. 2 is a graph which illustrated a characteristic of the typical architectural structure.

FIGS. 3-6 illustrate vibration characteristics of undamped and damped roofing membranes.

FIG. 7 illustrates a variation of the FIG. 1 construction.

DETAILED DESCRIPTION OF THE DRAWING

Referring now to the drawings in greater detail, FIG. 1 illustrates an architectural structure 10 in the assembled and erected condition and embodying the invention. As was indicated in U.S. Pat. No. 3,215,153, the structure 10 may range from a relatively small shelter to a comparatively large structure covering, for example, a stadium or an arena. The structure 10 comprises two or more arcuate arch members 12, pivotally connected at their lower ends to a support surface, such as the ground, or to a frame 14, in the manner described in the above mentioned patent. It should be noted that the members 12 may be positioned adjacent or next to one another, as at 15 (FIG. 1), or, as illustrated in FIG. 7, may be widely separated. The arch members 12 extend outwardly from the center of the structure 10 at a suitable angularly inclined position defining the terminal edges 16 of the structure 10.

The peripheral portions of the arch members 12 are operatively connected to a suitable roofing material 18 which extends therebetween and is maintained under controlled tension defining the roof line of the structure. Further stability of the structure is achieved, if desired, by employing suitable anchoring means such as columns or cables 20 which are connected to the arch members 12 at one end thereof, restraining further angular pivoting movement of the arch members and maintaining the roofing material 18 under the prescribed tension, the other end of the cables 20 being anchored.

Where protection or covering in addition to the extended roofing material 18 is desired, end walls or curtains 22 may be employed, extending around all or a portion of the open ends of the structure 10 and may be suspended from the arch members 12. If desired, the end walls 22 may be of a structural material and anchored at the lower ends thereof so as to serve as restraining means in lieu of employing the columns or cables 20.

The combination of curved arches 12, membrane 18 and positioning or anchoring system 20 produce a warped surface in the membrane 18.

In larger structures it is desirable to support the membrane 18 by longitudinal tension members 24, such as cables or webbing, extending between the arches 12. The membrane 18 and the members 24 can be preloaded or shaped by inverted tension members 26. Either or both the members 24 and 26 can be attached to the membrane 18 to help hold it in place. In other words, the members 26 may act just the opposite of the members 24, the latter providing support for the membrane 18 and the former holding the membrane 18 and/or the members 24 down, thereby preventing "ballooning."

It is essential that membranes 18 and/or longitudinal tension members 24 have sufficient sag to enable it or them to support a roof load, when the cable or other member 24 is under a reasonable tension value. In other words, the tension force required in a cable to support a load perpendicular to the length of the cable without cable sag is infinitely large and thus prohibitive, whereas with a sag of at least 5 percent of the span between the crowns of the arches and preferably between 5 to 10 percent, tension becomes reasonable, as illustrated in FIG. 2.

It can be readily understood that, with the above mentioned sag built into a membrane 18 and its associated tension members 24, the members 18 and 24 can vibrate between the arches 12 with an amplitude that is double the amount of sag (see FIG. 3), thereby, tending to produce the above described objectionable and/or destructive states. Now, if large membranes are broken up into smaller areas (see FIGs. 4 and 5), sufficient sag can be tolerated for the membrane to support a heavy load on its surface. The vibrations in the small areas, at twice the amplitude of the small sag value, will not produce unreasonable tension values on the membrane, i.e., the vibratory forces in the membrane, and "local" flutter therein, are under control and the membrane can support heavy loads of snow, wind, sand or rain.

If the smaller areas are made variable in size, such as by varying the spacing of the inverted tension members 26 (FIGS. 6 and 1) and/or varying the spacing of the longitudinal tension members 24 (FIGS. 1 and 6), the roof system is, to some extent, de-tuned. In other words, with unevenly spaced nodes (FIG. 6), the system is less apt to reach a point of resonance or a harmonic state that will cause damage.

Referring once again to FIG. 1, it may be noted that, with the arches 12 being pivotally inclined outwardly from each other, the longitudinal cables or members 24 and the inverted cables or members 26 will necessarily be of different lengths. Hence, under a given roof load, they will have different tension values. If desired, the members 24 and 26 may, additionally, be pre-tensioned to different values at assembly, or made of different diameters, to further enhance the diminution of vibration periods of the membrane 18. The differing lengths and/or variable pre-tensioning of the members 24 and 26 serve to further effectuate a de-tuned roof system.

It should now be apparent that the resultant combination of uneven spacing, different lengths and/or pre-tensioning of the members 24 and 26 can satisfactorily prevent the membrane 18 for attaining its natural frequency or some harmonic period of vibration that ultimately causes the roof system to "gallop" or the structure to vibrate in increasing tempo until damage or failure occurs.

It should also be apparent that, in particular configurations, the areas formed by the members 24 and 26 may be rectangular or diamond shaped, as well as being substantially square shaped, as illustrated in FIG. 1.

While certain embodiments of the invention have been shown and described for purposes of illustration, other modifications of the invention may be possible within the scope of the appended claims.

I claim:

1. A portable, semi-rigid architectural structure comprising a plurality of arches with formed bight sections, said arches being inclined from a common support and tilted outward from each other, a first plurality of longitudinal support members attached between said arches, a second plurality of transverse restraining members operatively connected to said longitudinal support members for holding said longitudinal support members in position, at least one of said first and second pluralities of members varying in length and being unevenly spaced, a membrane operatively connected to said support members and spanning said arches, said membrane forming a tensioned warped roof for the structure, said members and membrane cooperating to effectuate a de-tuned roof system, and means for anchoring said arches to said common support for maintaining said longitudinal support members and said membrane in tension.

2. The structure described in claim 1, wherein said anchoring means includes a plurality of cables.

3. The structure described in claim 1, wherein said anchoring means includes end walls.

4. A portable, semi-rigid architectural structure comprising a plurality of arches with formed bight sections, said arches being inclined from a common support and tilted outward from each other, a first plurality of longitudinal support members attached between said arches, a second plurality of transverse restraining members operatively connected to said longitudinal support members for holding said longitudinal support members in position, at least one of said first and second pluralities of members varying in diameter, a membrane operatively connected to said support members and spanning said arches, said membrane forming a tensioned warped roof for the structure, said members and membrane cooperating to effectuate a detuned roof system, and means for anchoring said arches to said common support for maintaining said longitudinal support members and said membrane in tension.

5. A portable, semi-rigid architectural structure comprising a plurality of arches with formed bight sections, said arches being inclined from a common support and tilted outward from the center of said structure, a plurality of longitudinal support members attached between said arches, a plurality of transverse restraining members operatively connected to said longitudinal members for holding said longitudinal members in position, said support and restraining members being variably pre-tensioned, a flexible membrane suspended between and operatively connected to said plurality of arches to form a double curved roof for said structure, said flexible membrane being tensioned longitudinally between said plurality of arches to pre-load said flexible membrane for diminishing vibration in said double curved roof and having a sag of at least 5 percent of the span between the crowns of said arches, and means for anchoring said arches to said common support for maintaining said flexible membrane in said pre-loaded condition.

6. In a pavilion, two arches mounted on the ground or another base so that they are inclined away from each other and may be swung toward and away from this position, elongated flexible supporting members which extend from one to the other of the arches and are attached to them, elongated flexible restraining members which extend transversely of the supporting members, a membrane which overlies the supporting and restraining members and extends from one to the other of the arches and is attached to the members and the arches and forms with the members the roof of the pavilion, and tie-downs which are connected to the arches and the base and pull downwardly on the arches and tension the roof.

7. The pavilion claimed in claim 6 in which the elongated flexible members of one group are unevenly spaced.

8. A portable, semi-rigid architectural structure comprising a plurality of arches with formed bight sections, said arches being inclined and pivoted from a common support and tilted outward from the center of said structure, a flexible membrane suspended between and operatively connected to said plurality of arches that has a concave curvature between the crowns of said arches of at least 5 percent to form a double curved roof for said structure, said membrane being tensioned both longitudinally and transversely between said arches to diminish vibration in said membrane, and means for anchoring said arches to said common support to maintain said flexible membrane in tension.

9. The architectural structure described in claim 8, wherein said anchoring means includes a plurality of cables.

10. The architectural structure described in claim 8, wherein said anchoring means includes at least one end wall having a double curvature and being pre-loaded to diminish vibration in said end wall.

* * * * *